R. G. LECKIE'S
"Improved Process and Apparatus for the Manufacture of Salt"

116970

PATENTED JUL 11 1871

Witnesses: S. J. Noyes, W. E. Raymond

Inventor: R. G. Leckie by H. W. Beadle atty.

116,970

UNITED STATES PATENT OFFICE.

ROBERT GILMOUR LECKIE, OF ACTON VALE, CANADA.

IMPROVEMENT IN APPARATUS FOR THE MANUFACTURE OF SALT.

Specification forming part of Letters Patent No. 116,970, dated July 11, 1871.

*To all whom it may concern:*

Be it known that I, ROBERT GILMOUR LECKIE, of the village of Acton Vale, county of Bagot and Province of Quebec, Canada, gentleman, have invented certain new and useful Improvements in the Manufacture of Salt and in the Apparatus used therefor; and I do hereby declare that the following is a full, clear, and exact description of the construction and operation of the same, reference being had to the annexed drawing, where—

Figure 1:
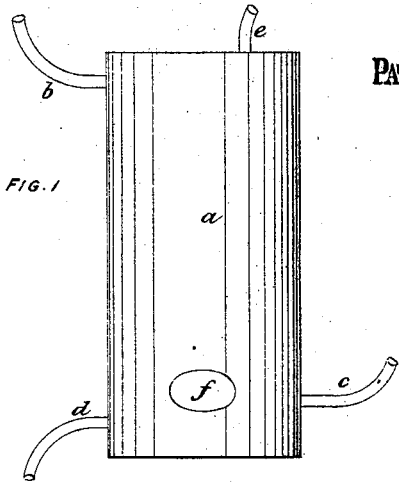
Figure 2:
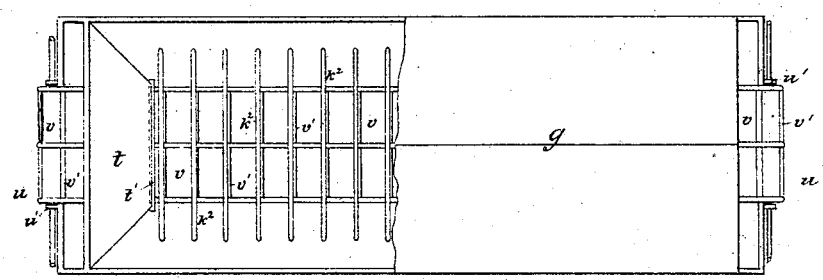
Figure 4:
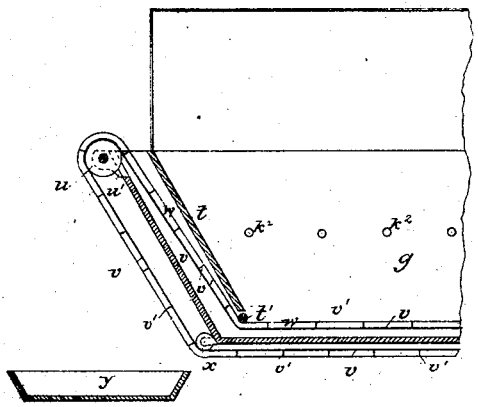
Figure 3:
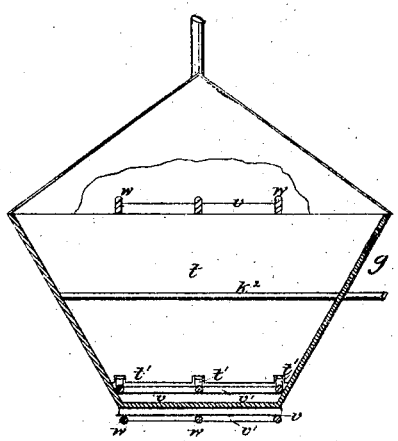

Figure 1 represents a view of purifying-vessel. Fig. 2 represents a plan of evaporating-vessel. Fig. 3 represents a section of evaporating-vessel. Fig. 4 represents a section of end of evaporating-vessel.

My invention has reference both to means to be employed for purifying the brine before or during the process of evaporation, more particularly from the chlorides of calcium and magnesium contained therein, and also for removing from the evaporating-vessel the salt crystals as they form and fall down, automatically and continuously, without at any time interrupting the process of the manufacture.

The brine, either in its natural condition or partially concentrated, having been received into any suitable closed vessel $a$, provided with an inlet-pipe, $b$, steam-pipe $c$, outlet-pipe $d$, pipe for exhaust steam $e$, and man-hole $f$, or their equivalents, is ready for purifying. To eliminate from the brine the chloride of magnesium contained therein I add to the brine as much caustic lime (or to avoid excess a little less) as may be necessary to decompose it, the result of the addition of the lime being not only the decomposition and precipitation of the chloride of magnesium, but the formation of an additional amount of chloride of calcium. Should any bicarbonates be present, as is often the case in fresh brine, so much lime as will combine with the excess of carbonic acid may be added. I now add simultaneously or subsequently so much sulphate of soda as may be necessary to decompose the chloride of calcium originally contained in the brine together with that formed by the action of the lime upon the chloride of magnesium. The result of the addition of the sulphate of soda is that the chloride of calcium in the brine is converted into chloride of sodium and insoluble sulphate of lime. The brine may now be treated for the precipitation of the sulphate of lime by heating it with hot air or superheated steam, as in my former invention for which Letters Patent in the United States have been granted, preferably under pressure, to a temperature of from 212° to 240° Fahrenheit. By the combined action of the heat and pressure the sulphate of lime is precipitated and may be removed in any ordinary manner. The brine may then be run off for further treatment.

My improvements in the apparatus for the manufacture of salt may be briefly described as follows, similar letters of reference indicating like parts in the drawing:

$g$ is a vessel, of any convenient size and material, of the figure shown in the drawing, and having, at its ends, a space cut off by a partition, $t$, at the same angle of inclination as the end of the vessel, and reaching to within a short distance of the bottom of the vessel. At the lower edge of the partition $t$, and projecting slightly, is placed any convenient number of friction-pulleys or rollers $t'$. Drums $u$, supported on brackets $u'$, carried out at the ends of the vessel, give motion to an endless band, $v$, of canvas or any other suitable texture or flexible substance, having strips $v'$ of any convenient material attached to it across its width and projecting from the face of the band $v$ as much as may be required. At right angles to these strips and along the whole length of the band $v$ is attached any convenient number of ropes, $w$, or their equivalents, placed so as to come in contact with the friction-pulleys $t'$, and thus preventing the strips $v'$ from touching the bottom of the partition $t$ during the revolution of the band $v$. $x$ is a friction-roller, placed where shown, and $y$ any shallow vessel for the reception of the salt, or it may be in the form of a hopper, discharging into any suitable vessel for removal. $k^2$ are perforated pipes, by means of which the hot air or superheated steam is injected into the brine for the purpose of evaporating it.

The manner in which my improvement is operated is this: The brine placed in the vessel $g$ is evaporated by the injection of hot air or superheated steam through the perforated pipes $k^2$, as in my former invention, the salt crystals so formed being deposited on the band $t$. By the revolution in the same direction of the drums $u$, to which motion is given in any ordinary manner, the band $t$ travels in the direction shown by the arrows, either continuously or from time to time as the accumulation of salt requires, the ropes $w$ running under the friction-pulleys or rollers $t'$, the salt, while the band $t$ is on an inclined plane, as shown, being prevented from sliding down by the transverse strips $v'$. As the band $v$ comes over the drum $u$ the salt is deposited in the vessel $y$, from which it can be removed in any ordinary manner, or, passing through $y$, is conveyed away as may be found convenient.

Having thus described the construction and operation of my invention, to which I have given the name of "Leckie's improved process and apparatus for the manufacture of salt," what I claim as my invention, and wish secured by Letters Patent, is the new and useful improvements in the manufacture of salt and in the apparatus used therefor, as follows:

The traveling surface $u$, transverse strips $v'$, ropes $w$, friction-pulleys or rollers $t'$, together with the evaporating-vessel $g$, and other parts of the apparatus, working substantially as and for the purposes set forth.

Montreal, 20th day of April, A. D. 1871.

ROBERT GILMOUR LECKIE.

Witnesses:
    CHARLES LEGGE,
    CHARLES G. C. SIMPSON.